Dec. 30, 1930.  E. L. DELANY  1,787,105

HANDLE

Filed April 11, 1927

Inventor
Edward L. Delany.
By C. R. Wright, Jr.
Attorney

Patented Dec. 30, 1930

1,787,105

UNITED STATES PATENT OFFICE

EDWARD L. DELANY, OF BROOKLYN, NEW YORK

HANDLE

Application filed April 11, 1927. Serial No. 182,917.

My invention relates to improvements in handles.

The object of my invention is to provide means for attaching a handle made of china, glass, porcelain or the like to a metal operating stem or member, whereby the heat from the operating member is not transmitted to the china, glass or porcelain handle, but is transmitted to the member and radiated therefrom.

Another object of my invention is to provide means whereby the china, glass or porcelain handle may be readily attached or detached to the operating member, and at the same time providing a handle capable of being attached to the operating stem or member of different sizes and shapes, whereby the handle is capable of varied uses so that the parts can be interchanged and a standard size handle placed on attaching members of different sizes and shapes.

A further object of my invention is to provide a simple, cheap and effective attaching means for handles of this character having certain details of structure and combination of parts hereinafter more fully set forth.

Figure 1:
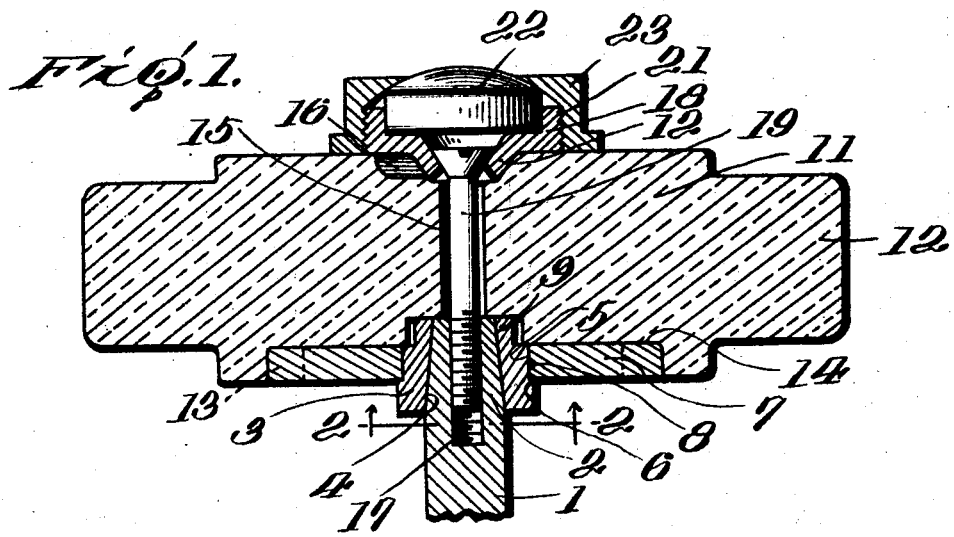
Figure 1 is a vertical sectional view of my improved handle attached to a metal operating stem or member.
Figure 2:
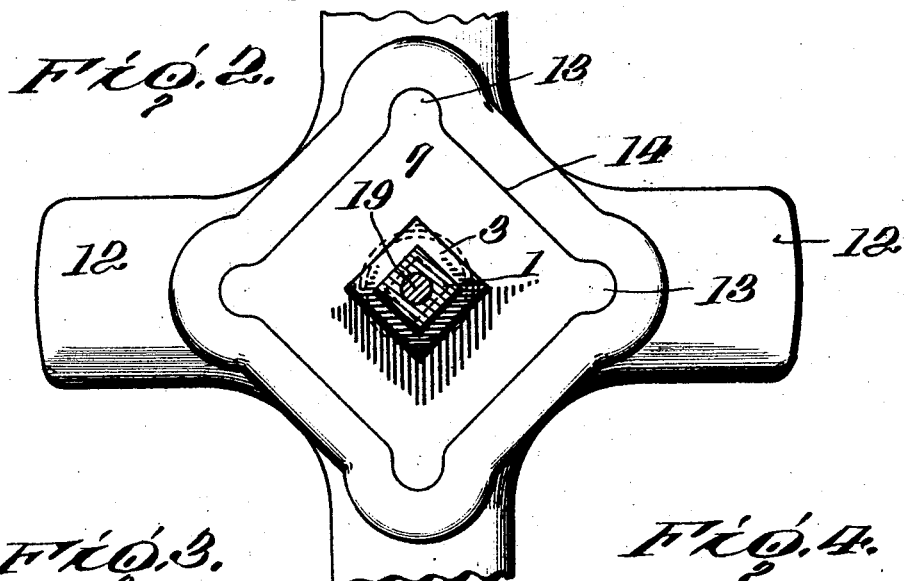
Figure 2 is a transverse sectional view taken on the line 2—2 of Figure 1, looking in the direction of the arrows.
Figure 3:
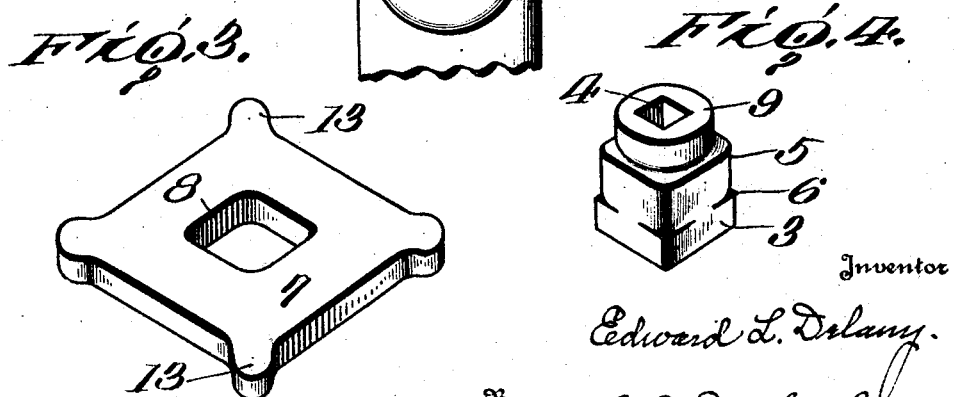
Figure 3 is a detached perspective view of the attaching plate.
Figure 4:
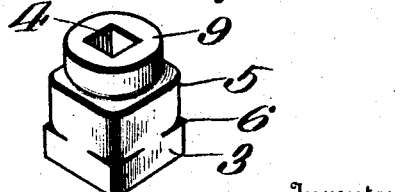
Figure 4 is a perspective view of the interchangeable bushing.

My invention is designed more particularly for attaching a china, glass or porcelain operating handle to a valve stem, and while I have shown and described the same for this purpose it will be understood that the invention can be applied any place where it is desired to attach a china, glass or porcelain handle to a metal operating member subject to high temperatures to prevent the conduction of the heat to the handle. In the art of bath valves and fixtures, it has been found that where the china, glass or porcelain handle comes in direct contact with the metal valve stem the heat is readily transmitted directly from the valve stem to the handle and the expansion and contraction of the metal and china, glass or porcelain handle is so vastly different that the handle is broken by this difference of expansion. This is particularly true when used on hot water spigots and where the handle is heated to a high degree, and then subject to a rapid cooling. In valves of this character where there is a tight fit between the valve stem and the porcelain handle, and where the metal stem directly engages the porcelain handle, it has been found that the engagement of the china, glass or porcelain handle by the cold hands or by a few drops of cold water thereon, the handle will crack and break and operators of such valves have more or less injured their hands by the breaking of the handle. This invention eliminates all of these defects in that the heat from the stem is not transmitted directly to the handle, but is transmitted to the attaching plate having a large area and necessarily a large radiating surface so that the heat is not transmitted to the handle and thus the same will not become heated to any perceptible degree.

Referring now to the drawings, 1 represents the valve stem or operating member, and for the purpose of full illustration of the invention it will be stated that this valve stem leads to the hot water spigot, and therefore the valve stem is subjected to considerable heat when drawing hot water from the spigot. The valve stem, as is readily understood, is made of metal and therefore is highly heated by the hot water from the spigot. In my improved invention, the upper end of the valve stem 1 is preferably made of square or angular form, as indicated at 2, and slightly tapering and fitting into a bushing 3, having a correspondingly shaped opening 4 therethrough. This opening, while shown of a square form can be made of any desired form such as to prevent a rotary motion of the bushing on the valve stem. The rectangular portion of the bushing has its corners cut away as indicated at 5, forming the shoulders 6 against which the attaching plate 7 bears to limit the downward movement of the attaching plate on the bushing. The opening 8 in the attaching plate is of a square form and leaves a slight space at each of the four corners between the bushing and the plate. The upper end of the squared portion of the bushing is provided with a circular projection 9 adapted to extend within the recess 11 in the china, glass or porcelain handle 12.

The plate 7 is substantially of a rectangular form having at its four corners the outwardly curved projection 13, and the lower face of the handle 12 is provided with a correspondingly shaped recess 14 extending into the arms 12' of the handle, whereby the plate can be enlarged to a great extent and the strain on the arms is taken up by the plate. The handle 12 has extending therethrough an opening 15 and has its lower end communicating with the recess 11. The upper end of the opening 15 communicates with a recess 16 in the outer face of the handle 12. The valve stem is provided with a screw threaded opening 17 in its upper end, and fitting within the recess 12 is a saucer shaped member 18 having an opening therethrough and through which passes the attaching screw 19, which has its lower end threaded as indicated at 20, and which is screwed into the opening 17 in the valve stem. Thus it will be seen that the handle is clamped tightly to the attaching plate 7. The screw 19 is of a diameter less than the opening 15 in the china, glass or porcelain handle so that the heat will not be transmitted directly from the screw to the handle. The saucer shaped member 18 is externally threaded as indicated at 21 and receives the designating plate 22, and screwed upon the threads 21 of the saucer shaped member 18 is a cap 23 which engages the upper face of the designating plate 22 and clamps the same in the saucer shaped member 18.

From the foregoing description it will be seen that the heat conducted from the valve stem 1 is transmitted from the bushing to the attaching plate 7 and which being of a large area the heat will be radiated therefrom and very little will be conducted to the handle 12. The plate 7 is locked on the bushing against rotation and due to the angular shape of the plate and the ears 13, the plate is held against rotation in the recess in the handle and the rotation of the handle causes the plate 7 to rotate therewith, and which in turn rotates the bushing and said busing in turn rotates the valve stem. By this arrangement it will be seen that the strain of the valve stem is distributed over a greater contacting surface with the china, glass or porcelain handle, and therefore, it is not liable to break in the operation of the valve.

Having thus fully described my invention what I claim is:—

1. In a device of the character described an operating stem, a bushing having a tapering interlocking connection with the operating stem for holding the same thereon against rotation, an attaching plate removably carried by the bushing, and held against rotation thereon, a composition handle having a recess in its lower face corresponding to the shape of the attaching plate, and a clamping screw passing through the handle and spaced therefrom and screwed into the operating stem for clamping the attaching plate in the recess in the handle.

2. In a device of the character described an operating stem having its outer end tapering and of an angular form, a bushing tightly fitting the outer end of the operating stem, and having an angular exterior surface, and an attaching plate fitting said angular portion of the bushing and held against downward movement thereon, a composition handle having a recess to receive the attaching plate, and a clamping screw passing through the handle and spaced therefrom and screwed into the operating stem, and clamping the attaching plate in the recess in the handle.

3. In a device of the character described a handle having extending arms an operating stem, and an attaching plate carried by the stem and held against rotation thereon, and shaped to extend into said arms and interlocked therewith to prevent rotation relative thereto.

4. In a device of the character described an operating stem, an angular attaching plate having an angular opening to receive the stem, and a handle having arms, said handle and arms having recesses to receive the angle portion of said plate.

5. A device of the character described, comprising an operating stem, a bushing removably secured to the stem, an attaching plate removably carried by the bushing and held against rotation thereon, a composition handle having a recess in its lower face of a shape corresponding to that of the attaching plate, and a clamping screw passing through the handle and spaced therefrom, and screwed into the operating stem for clamping the attaching plate in the recess in the handle.

In testimony whereof, I have signed this specification.

EDWARD L. DELANY.